Figure 1:
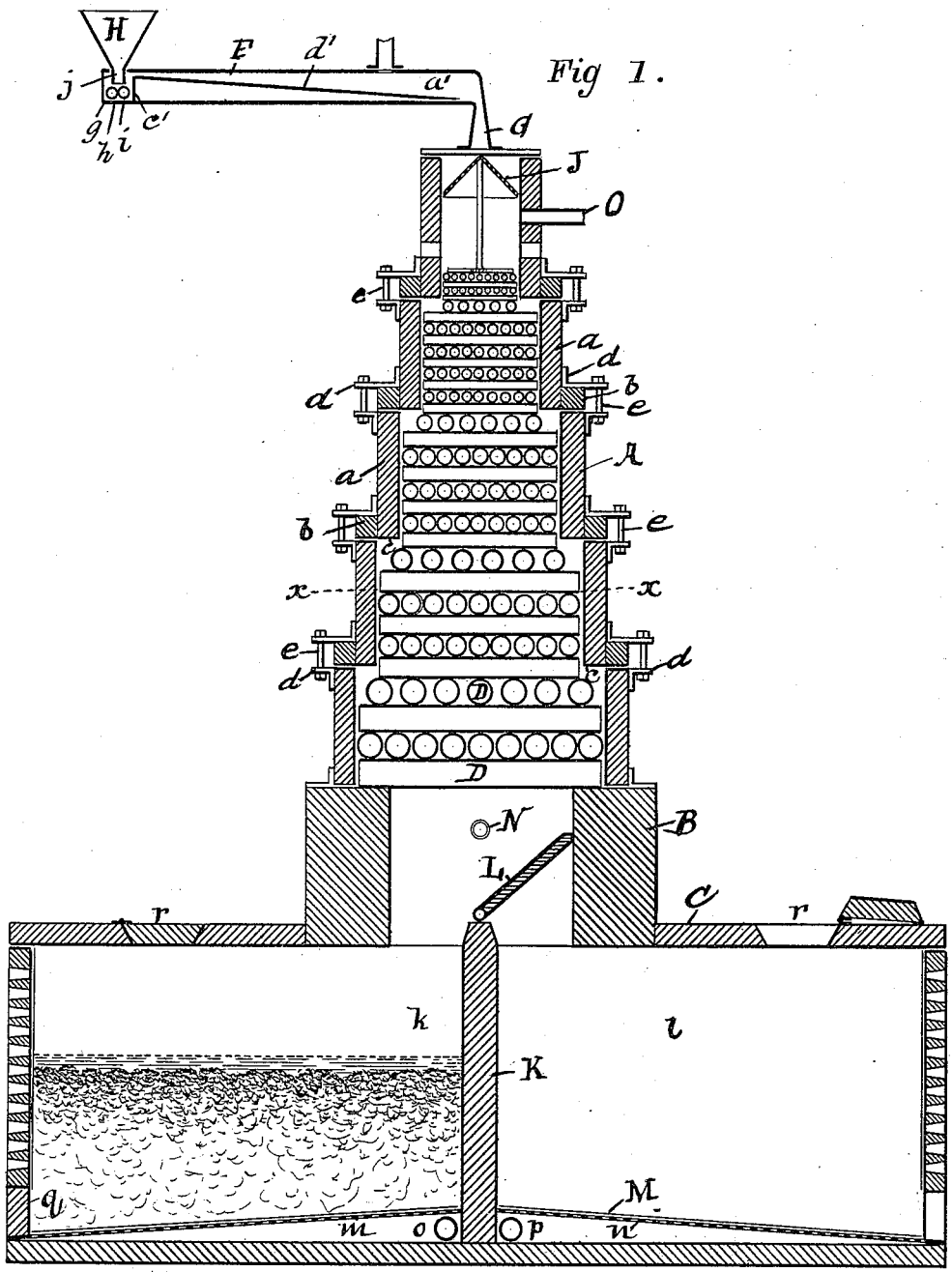

(No Model.)
2 Sheets—Sheet 1.

J. CRAGG.
PROCESS OF EXTRACTING GOLD OR SILVER FROM ORES.

No. 449,815. Patented Apr. 7, 1891.

WITNESSES
Dan'l Fisher
B. M. Howard

INVENTOR
Joseph Cragg,
by Howard atty.

(No Model.) 2 Sheets—Sheet 2.
J. CRAGG.
PROCESS OF EXTRACTING GOLD OR SILVER FROM ORES.
No. 449,815. Patented Apr. 7, 1891.
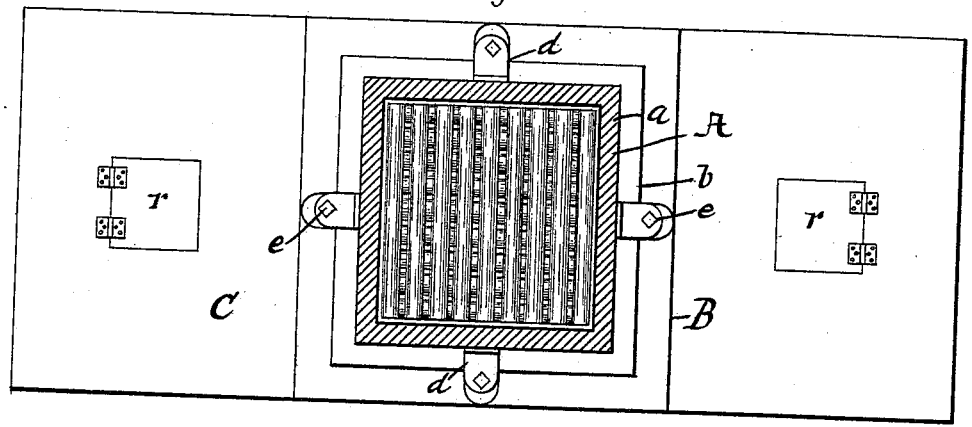
Fig. 2.
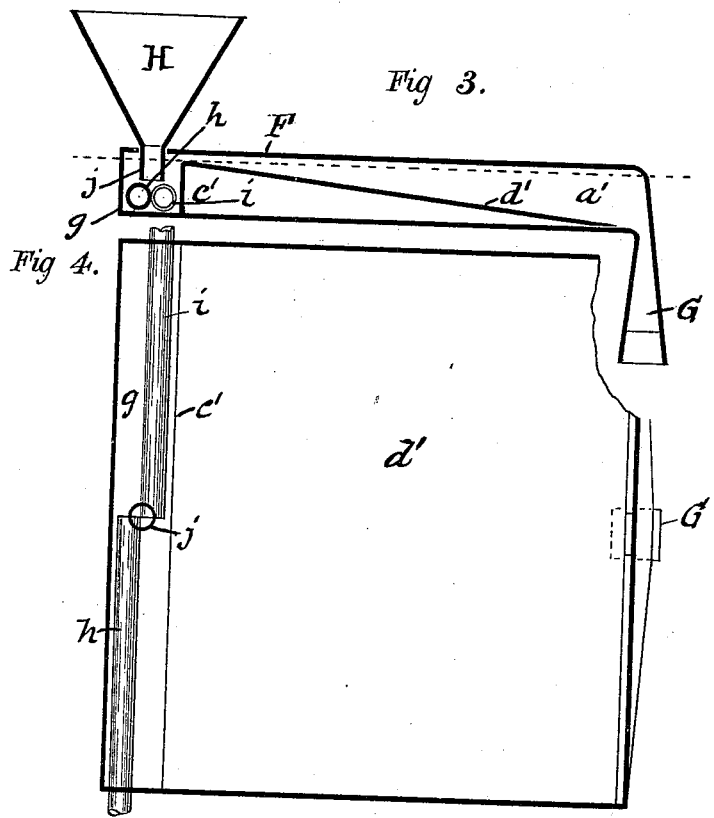
Fig. 3.
Fig. 4.
WITNESSES
Dan'l Fisher
B. W. Howard
INVENTOR
Joseph Cragg,
by W. W. Howard, atty.

UNITED STATES PATENT OFFICE.

JOSEPH CRAGG, OF BALTIMORE, MARYLAND, ASSIGNOR TO SAMUEL WILKINS CRAGG, OF SAME PLACE.

PROCESS OF EXTRACTING GOLD OR SILVER FROM ORES.

SPECIFICATION forming part of Letters Patent No. 449,815, dated April 7, 1891.

Application filed January 7, 1890. Renewed January 16, 1891. Serial No. 378,026. (No model.)

*To all whom it may concern:*

Be it known that I, JOSEPH CRAGG, of the city of Baltimore and State of Maryland, have invented an Improved Process for Extracting Gold, Silver, and other Metals from Ores or Materials Containing them, of which the following is a specification.

This invention relates to an improved process for extracting gold, silver, and other metals from their ores, in which the metals are attacked by chlorine, bromine, or the like reagents, and thereby reduced to soluble salts, which are removed from the ores by lixiviation and the metals finally recovered by precipitation, as will hereinafter appear.

In the further description of the said invention which follows reference is made to the accompanying drawings, forming a part hereof, and in which—

Figure 1 is a vertical central section of the improved apparatus; and Fig. 2, a transverse section of the same, taken on the dotted line $x\,x$, Fig. 1. Figs. 3 and 4 are respectively a cross-section and a sectional plan of that part of the apparatus wherein the ground ores and liquids are thoroughly mixed and made into a thin liquid pulp of uniform density.

Similar letters of reference indicate similar parts in all the views.

In the said drawings, which represent the apparatus which I preferably employ in carrying out my improved process, A represents the tower in which liquid pulp to be treated is introduced. This tower may be constructed of any suitable material and in any shape; but it preferably consists of a series of sections $a$ of wood rectangular in cross-section and lined with sheet-lead to make them water and gas tight and capable of resisting the action of chemicals employed in the improved process. These sections are of different sizes and placed one upon another, the largest section being at the bottom and the smallest one at the top. The lower end of each section $a$, except the bottom one, is provided with a flange $b$ to increase the size of its base and adapt it for union with the upper end of the section next beneath it, and the sheet lining $c$ is turned in between the sections to form tight joints. Brackets $d$ and bolts $e$ serve to secure the sections together, as shown.

The tower A is seated on a rectangular base B, which in turn rests on a tank or vat C, hereinafter more fully described. The tower is filled or partially filled with bars or surfaces D, not connected to the sides of the tower, and of different sizes, stacked in layers, which are crossed. The lowest layer of bars rests on the base B, which projects beyond the inner face of the tower, and the others are piled or stacked on them with small spaces between them to allow of the passage down the tower of the liquid pulp. The said bars may be made of any suitable material not injuriously acted on by the chemicals employed in the apparatus, and they may have any shape of cross-section and be either solid or hollow. I prefer, however, to make the bars of glass and in the form of hollow cylinders, and stacked with the largest ones below, and with the size of the bars diminishing toward the top, as shown in Fig. 1. The desired separation of the bars in each layer or row is easily effected by inserting between them narrow strips of sheet-lead or by encircling the bars with narrow rubber bands of the requisite thickness.

F is the mixer wherein the ore and some liquid reagent, such as a solution of chlorine or bromine, are mixed to the consistency of very thin pulp, and it consists of a closed tray $a'$, which is erected over the tower, with a channel G, extending downward therefrom to the upper part of the tower. Within this tray is a partition $c'$, which extends from the bottom to near the top, and from the edge of the partition leads an inclined plate $d'$, which terminates over the pipe G. The partition $c'$ forms within the tray a gutter or trough $g$, which extends transversely of the same. The liquid-pipes $h$ and $i$ enter it from opposite sides and end or terminate at the center. (See Figs. 3 and 4.) These pipes are out of alignment, as shown. In the center of the trough and directly over the point where the two pipes meet is a hopper H, into which the ore or material is introduced, with a pipe $j$ leading from it to the trough.

J is a perforated conical or pyramidal distributer for the liquid pulp, situated in the upper part of the tower and supported, preferably, from the top layer or row of bars by means of a stalk with a spreading base.

The tank or vat hereinbefore alluded to is divided by a bulk-head K into two chambers $k$ and $l$, and either of these chambers may be placed in communication with the tower by means of a swinging door L, which constitutes the upper end of the said bulk-head. The stem or shaft of the swinging door L passes through suitable stuffing or packing boxes (not shown) at the sides of the base, to prevent leakage. The chambers $k$ and $l$ are each furnished with an inclined perforated or grated false bottom $m$ and $n$, and beneath these false bottoms are pipes or openings $o$ and $p$, which lead to the precipitating-tanks. (Not shown.) The front wall of each chamber is fitted with a door $q$, through which the solid contents may be washed out when the same have been freed from the valuable salts, and above this door the wall is perforated, as shown. The perforated front walls and the false bottoms are covered with some suitable filtering material, such as cotton duck, which in the drawings is denoted by M.

The top of the tank or vat is provided with man-holes $r$, through which access to its contents may be had, and both the tower and vat may be provided with a number of peep-holes through which the interior of the same can be inspected. The pipes for the entrance and exit of the chlorine or equivalent gas are respectively denoted by N and O.

The operation of treating ores by means of my improved apparatus is as follows: The ore is ground or pulverized to a finely-divided condition and introduced into the hopper H, from which it passes through the pipe $j$ to the trough $g$. On entering the trough it is divided into two streams, one falling in the front of each of the pipes $h$ and $i$. At the same time the liquid is admitted to the trough from an elevated tank (not shown) through the said pipes, and meeting with the finely-ground ore carries it in opposite directions in the trough. The effect of these reverse currents is to thoroughly mix the ore and liquid reagent and form a very thin pulp, which is uniform in its density, and this pulp passes over the partition $c'$ and down the inclined plate $d'$ to the channel G, thence into the tower. The chlorine or equivalent gas is introduced to the tower through the pipe N, and then finds its exit through the pipe O. The liquid pulp on striking the first or top row of bars or surfaces is formed into thin films or waves, which as they fall to the larger surfaces in their descent, become thinner, and by this gradual thinning and mixing of the waves or films, the particles of gold are more readily exposed to the action of the reagents present.

By having the bars D loose within the tower the lead lining need not be perforated, as would be the case if the bars were supported from the tower instead of from the base, as shown.

At the beginning of the operation the pipe $o$ is closed by means of a cock. (Not shown.) Consequently after the filling of the space below the false bottom, the filtering takes place at the front of the vat. The arrangement of the front filters facilitates the filtering operation and greatly increases the capacity of the vat, and the ore does not choke the filters as it does at the false bottom, but is deposited, and the comparatively clear liquid on the top of the ore is brought directly in contact with the filters. When the chamber $k$ is entirely full of pulp, the position of the swinging door L is reversed and the liquids and pulp conducted to the other chamber $l$. During the filling of the second chamber of the vat, the pipe $o$ is opened and the ore on the filter above is washed by fresh water introduced through the man-hole $r$ until the water passing from the pipe $o$ shows no decided trace of the chlorides. The ore is then discharged through the door $q$.

By closing the pipe $p$ until the clear liquid portion of the pulp is decanted or filtered through the front or side of filter, the solid portion is not packed, as would be the case if any escape of liquid from the bottom were permitted, and the soluble salts remaining in the said solid portion are therefore more readily washed out by the admission to its upper surface of fresh water, as described.

By alternate filling and discharging of the two chambers of the vat, as described, the operation of mixing, chlorinating, and lixiviating is a continuous one.

Suitable conduits lead from the front filters to precipitating-vats (not shown) in which any of the well-known methods of recovering the chlorides or the like held in solution may be practiced.

The chlorine which passes from the tower may be carried to a purifying apparatus, where it is freed from impurities by well-known means and used again.

With this apparatus it is not designed to use steam-coils or other appliances in the tower to heat the liquid reagents; but instead I may heat it by contact with heated pulp. By this means I am enabled to much simplify the apparatus without reducing its efficiency in that respect.

Cold solutions of the reagents—such as chlorine, bromine, and the like—are more stable than warm or hot solutions; but it is a great advantage to heat the said solutions when in contact with the ore.

I claim as my invention—

1. The process herein described of extracting gold, silver, or other metals from their ores in solution, which consists in agitating finely-divided pulp in minute drops of a solution of chlorine, bromine, or the like, in presence of a current of gas, such as chlorine, substantially as specified.

2. The process herein described of extracting gold or other metals from their ores in solution, which consists in passing liquid pulp in the state of minute drops or films through a current of gas, such as chlorine, substantially as specified.

3. The process herein described of extracting gold or other metals from their ores in solution, which consists in passing heated liquid pulp in a state of minute drops or films through a current of gas, such as chlorine, substantially as specified.

4. The continuous process herein described of extracting gold or other metals from their ores in solution, which consists in mixing ground or pulverized ore with a liquid reagent, then passing the liquid pulp in minute drops or films through a current of gas, such as chlorine, and then filtering the pulp, substantially as specified.

JOSEPH CRAGG.

Witnesses:
 WM. T. HOWARD,
 DANL. FISHER.